(12) United States Patent
Sato et al.

(10) Patent No.: US 6,911,751 B2
(45) Date of Patent: Jun. 28, 2005

(54) MOTOR

(75) Inventors: Katsushi Sato, Tokyo (JP); Takeshi Shinoda, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/880,082

(22) Filed: Jun. 30, 2004

(65) Prior Publication Data

US 2004/0263010 A1 Dec. 30, 2004

(30) Foreign Application Priority Data

Jun. 30, 2003 (JP) ................................. P. 2003-187935

(51) Int. Cl.[7] .............................................. H02K 11/00
(52) U.S. Cl. ........................................................ 310/71
(58) Field of Search ...................... 310/71, 89, 40 MM

(56) References Cited

U.S. PATENT DOCUMENTS 4,673,232 A * 6/1987 Kubota et al. ............... 439/441
5,216,305 A * 6/1993 Strobl ............................ 310/71

FOREIGN PATENT DOCUMENTS

JP          5-308754          11/1993

* cited by examiner

*Primary Examiner*—Darren Schuberg
*Assistant Examiner*—Nguyen N. Hanh
(74) *Attorney, Agent, or Firm*—Whitham, Curtis & Christofferson, PC

(57) ABSTRACT

A motor includes a case which has a containing portion in which a rotor is contained, a bracket which closes an opening of the containing portion, the bracket having a through hole, and a conductive elastic member which is provided in the through hole. The conductive elastic member urges a conductive wire against an inner face of the through hole so as to fix the conductive wire.

9 Claims, 3 Drawing Sheets

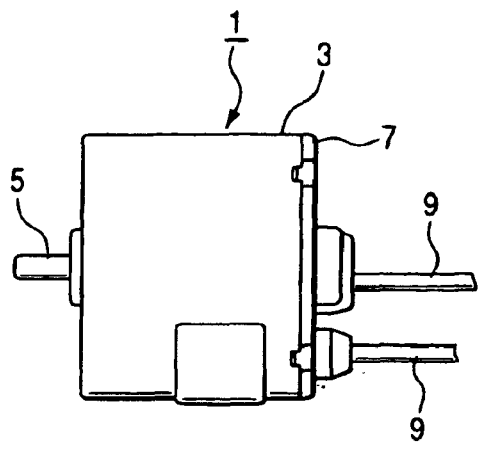
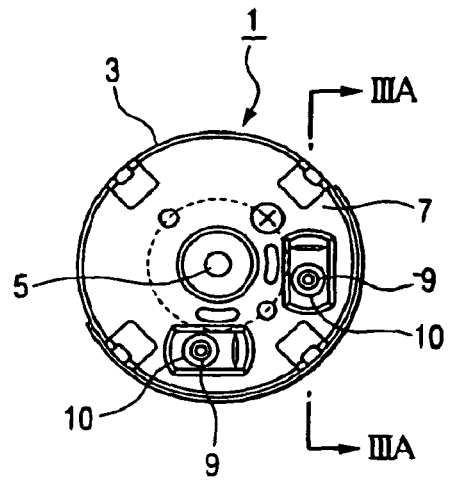
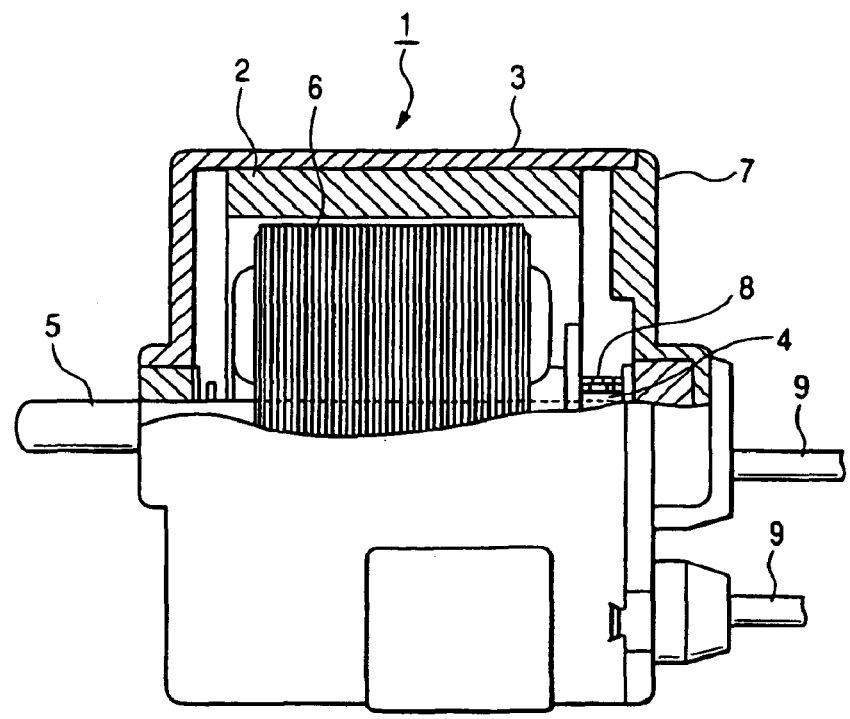

MOTOR

BACKGROUND OF THE INVENTION

The present invention relates to a motor. More particularly, the present invention relates to a small DC motor in which a rotor having a shaft fixed with a commutator that is accommodated in a cylindrical motor case having a bottom portion. A permanent magnet is fixed on the inner circumferential face of the bottom portion. Base portions of brushes coming into sliding contact with the commutator are attached to an inner face of a bracket for closing an open portion of the motor case. Lead wires to be connected to the outside are connected to the base portions of the brushes, wherein the lead wire can be easily attached.

Concerning the connecting structure to connect a brush or terminal with a lead wire in a related small DC motor of this type, the following connecting structure is well known. For example, as shown in the related example illustrated in FIG. 4 of JP-A-5-308754 (Pages 1 to 3, FIGS. 1 to 4), after the lead wire and the terminal are positioned and arranged in the bracket, the terminal and the core wire of the lead wire are soldered to each other while heating them.

According to this connecting structure, since the brush or the terminal of the small DC motor and the lead wire are soldered to each other, the following problems may be encountered. At the time of soldering work, flux of soldering is scattered and the brush and the bracket are contaminated by flux. Therefore, quality of soldering is deteriorated. Since it is necessary to add a process of inspection because soldering work is unstable, the manufacturing cost is raised and the quality cannot be stabilized.

In order to solve the above problems, JP-A-5-308754 describes the following lead wire fixing structure. A predetermined cutout portion is provided in at least one of the brush and the terminal, and the lead wire is press-fitted or calked into the cutout portion. Due to this connecting structure, soldering work becomes unnecessary.

However, even in the above lead wire fixing structure of the small DC motor, it is necessary to conduct press-fitting or calking of the lead wire. Therefore, much labor is needed for the fixing work, and quality of the lead wire structure to be fixed by press-fitting or calking can not be stabilized.

SUMMARY OF THE INVENTION

Therefore, technical problems are caused in the lead wire fixing work of the motor in order to eliminate the soldering work and fix the lead wire simply and positively. An object of the present invention is to solve these problems.

In order to achieve the above object, according to the present invention, there is provided a motor, comprising:

a case, which has a containing portion in which a rotor is contained;

a bracket, which closes an opening of the containing portion, the bracket having a through hole; and a conductive elastic member, which is provided in the through hole, wherein the conductive elastic member urges a conductive wire against an inner face of the through hole so as to fix the conductive wire.

In the above configuration, it is possible to simplify the conductive wire fixing work without conducting soldering. Also, the conductive wire can be simply and positively fixed.

Preferably, the conductive wire is inserted from a guide hole which communicates with the through hole. A diameter of the guide hole for guiding the conductive wire is expanded toward the outside.

In the above configuration, the conductive wire can be easily inserted.

Preferably, the motor further comprises a positioning member which is provided in the through hole, and which guides and positions an insertion of the conductive wire.

Preferably, the positioning member has a guiding face. A width of an insertion space of the conductive wire which is defined by the guiding face and the inner face of the through hole is substantially the same as that of the conductive wire.

In the above configurations, the conductive wire can be smoothly guided and positioned at a fixing position by the positioning member.

Preferably, a groove is provided on the inner face of the through hole for holding the conductive wire. The groove is extended along an extending direction of the through hole.

In the above configuration, the conductive wire can be stably held by the groove.

Preferably, the conductive elastic member has a forward end portion which extends in a direction diagonally to an extending direction of the through hole. The conductive elastic member urges the conductive wire in a direction diagonally to a direction perpendicular to the extending direction.

Preferably, the forward end portion of the conductive elastic member has a sliding end which slides on the conductive wire. The sliding end allows a sliding movement of the conductive wire in an insertion direction of the conductive wire. The sliding end restricts a sliding movement of the conductive wire in a drawing direction of the conductive wire.

In the above configurations, the conductive wire can be easily inserted, and further the conductive wire can be prevented from being drawn out, that is, the conductive wire can be positively fixed.

BRIEF DESCRIPTION OF THE DRAWINGS

The above objects and advantages of the present invention will become more apparent by describing in detail preferred exemplary embodiments thereof with reference to the accompanying drawings, wherein:

FIG. 1A is a front view showing a small DC motor according to an embodiment of the present invention;

FIG. 1B is a view showing an embodiment of the present invention, that is, FIG. 1 B is a side view showing a small DC motor;

FIG. 2 is a view showing an embodiment of the present invention, that is, FIG. 2 is a partially cut out enlarged front view showing a small DC motor;

DETAILED DESCRIPTION OF THE PREFERRED EMBODIMENTS

Figure 3A:
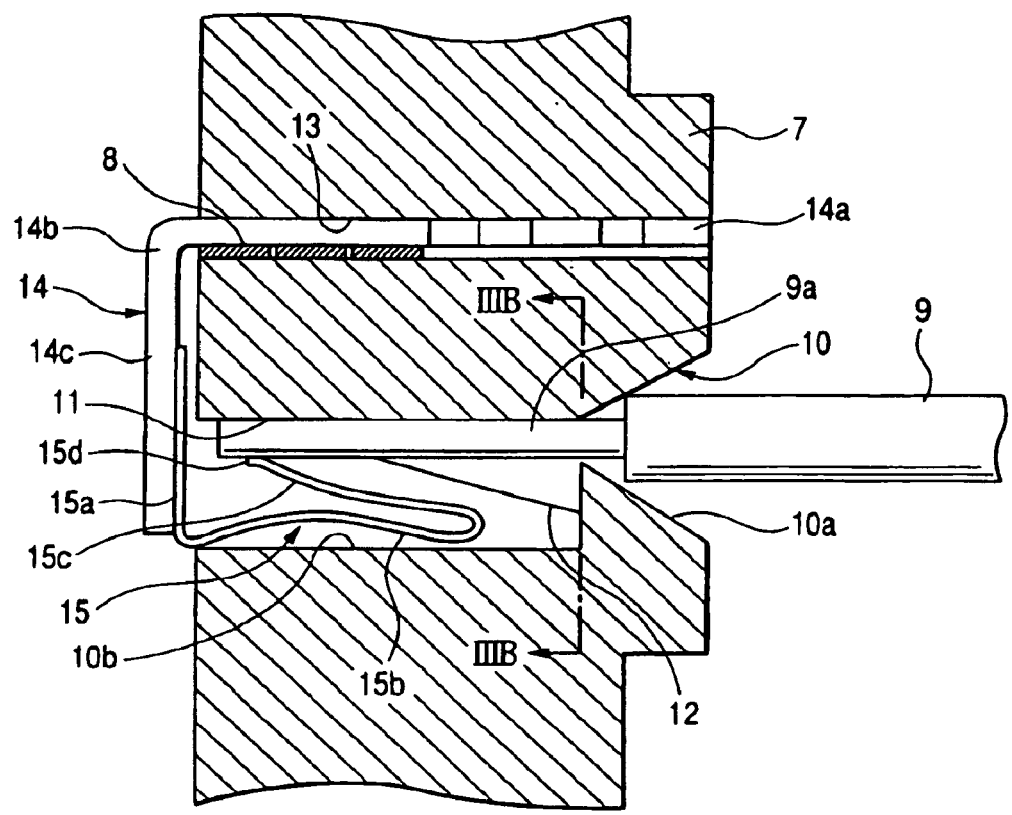
FIG. 3A is a partially sectional view taken on line IIIA—IIIA in FIG. 1B.

Referring to FIGS. 1 to 4, an embodiment of the present invention will be explained in detail below. In FIGS. 1 and 2, reference numeral 1 is a small DC motor. In the small DC motor 1, a permanent magnet 2 is fixed on an inner face of a cylindrical motor case 3 having a bottom portion. The rotor 6 having the shaft 5, to which the commutator 4 is fixed, is accommodated in the cylindrical motor case 3. Base portions of a pair of brushes 8, which come into sliding contact with the commutator 4, are attached on the inner face of the bracket 7 made of resin for closing an open portion of the motor case 3. The base portions of the brushes 8 are connected to the lead wires 9 for connecting with the outside via the terminals and the elastic conductor.

Figure 3B:
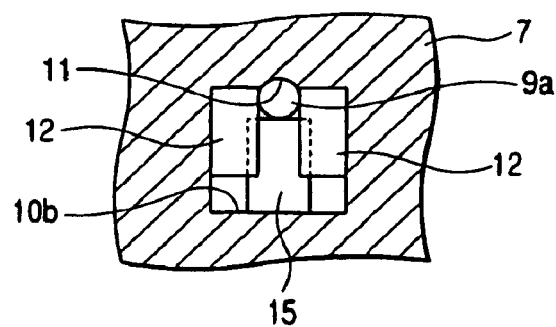
FIG. 3B is a sectional view taken on line IIIB—IIIB in FIG. 3A.

The through-holes 10, into which the core wires 9 a of the forward end portions of the lead wires 9 are inserted, are formed in the bracket 7 as being separated from each other by the angle of about 90°. As shown in FIG. 3, in order to guide the insertion of the core wire 9a, the tapered guide hole 10a, which expands toward the outside, is formed on the outside, is formed on the outside of the through-hole 10. The inside hole 10b is rectangular in shape and an opening inside is shown in the cross-section view.

The groove 11 is formed on one inner wall face (the upper wall face in FIG. 3A) of the inside hole 10b, in order to hold a portion of the outer circumferential face of the core wire 9a. The cross-section of the groove 11 is substantially semicircular, and extends in the inserting direction of the core wire 9a.

The guiding and positioning member 12 for guiding the insertion of the core wire 9a and positioning the core wire 9a is provided in a vicinity of the guide hole 10a of the inside hole 10b. As shown in FIG. 3A, the guiding and positioning member 12 has a triangle shape as in view from the front so that the guiding and positioning member 12 will not come into contact with the elastic conductor described later.

A terminal attaching hole 13 is formed at a position separate from the through-hole 10 by a predetermined interval. The terminal attaching hole 13 is substantially in parallel with the through-hole 10.

A brush 8 is attached to the vicinity of the bent portion 14b of the vertical portion 14a of the terminal 14 which is bent into a substantial L-shape. The brush 8 is attached so as to be perpendicular to the terminal 14. The base end portion 15a of the substantially L-shaped elastic conductor 15 is attached to the base end portion 14c of the terminal 14.

An upper end portion of the vertical portion 15b of the elastic conductor 15 is bent by the angle of about 180°. Therefore, the inclined portion 15c is formed toward the obliquely upper left portion in FIG. 3A.

Figure 4:
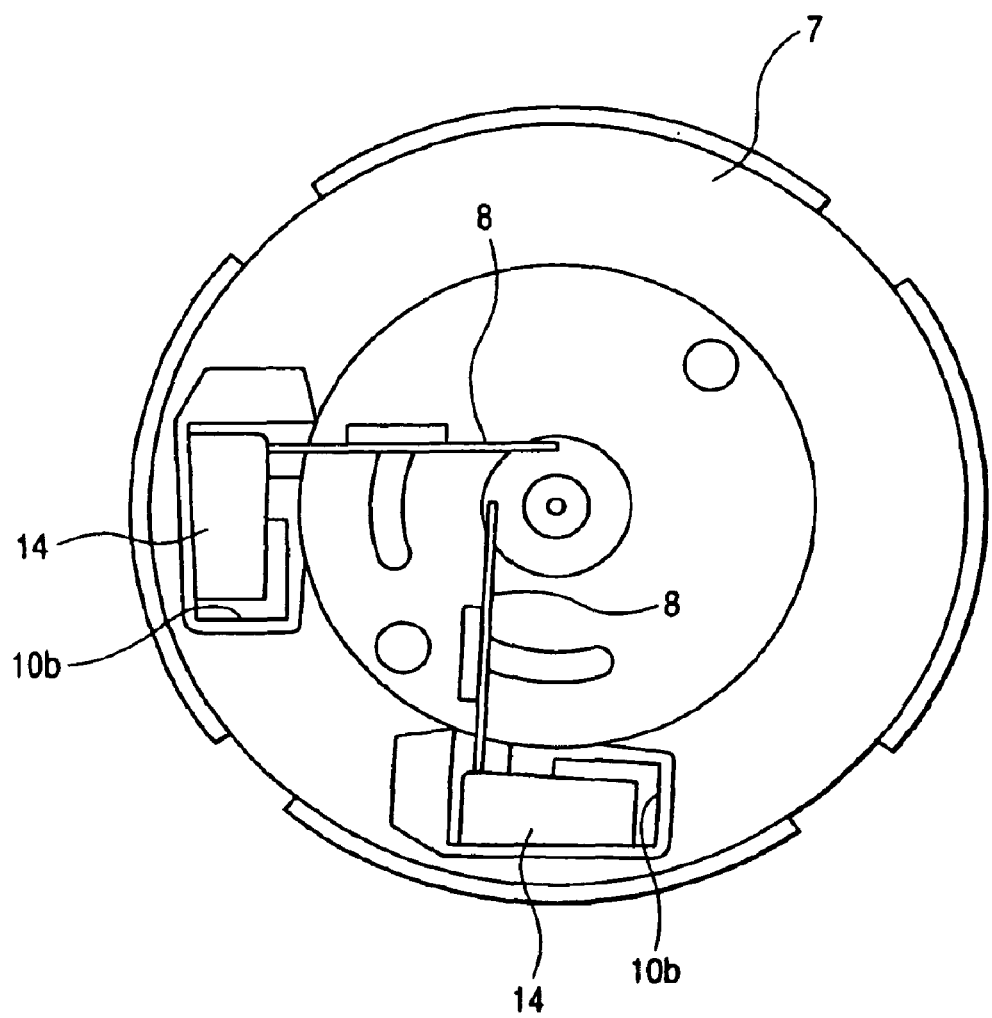
FIG. 4 is an inner side view showing a state in which a brush is attached to the bracket shown in FIG. 1.

When the vertical portion 14a of the terminal 14 is attached so that the vertical potion 14a is inserted into the terminal attaching hole 13, the brush 8 extends inward and freely comes into contact with the commutator (reference numeral 4 in FIG. 2) as shown in FIG. 4. In the same manner, the other brush 8 also extends inward making a right angle with the brush 8 and freely comes into contact with the commutator (reference numeral 4 in FIG. 2).

On the other hand, as shown in FIG. 3, when the core wire 9a of the lead wire is inserted into the inside hole 10b in a state that the vertical portion 15b and the inclined portion 15c of the elastic conductor 15 are inserted into the inside hole 10b, the forward end portion 15d of the inclined portion 15c of the elastic conductor 15 obliquely comes into pressure contact with the core wire 9a in the guide hole 10a. When the forward end portion 15d obliquely comes into pressure contact with the core wire 9a, the core wire 9a can be allowed to slide in the inserting direction. When the core wire 9a is inserted into the inside hole 10b, the core wire 9a is restricted by the forward end portion 15d so that it can not slide in the drawing direction, that is, the core wire 9a can be fixed.

As described above, in the small DC motor 1, the core wire 9a of the lead wire 9 is easily inserted into the inside hole 10b by the guide hole 10a, the core wire 9a is guided and positioned by the guiding and positioning member 12. The core wire 9a is held at a predetermined position by the groove 11, and the core wire 9a is easily inserted and prevented from being drawn out and fixed by the inclined portion 15c of the elastic conductor 15 so that the lead wire 9 can be simply and positively fixed.

It should be noted that variations may be made without departing from the spirit and scope of the present invention. Of course, the scope of the present invention covers the variations.

What is claimed is:

1. A motor, comprising:

a case, which has a containing portion in which a rotor is contained;

a bracket, which closes an opening of the containing portion, the bracket having a through hole;

a conductive elastic member, which is provided in the through hole; and a positioning member which is provided in the through hole, and which guides and positions an insertion of a conductive wire, wherein the conductive elastic member urges the conductive wire against an inner face of the through hole located adjacent to the positioning member so as to fix the conductive wire.

2. The motor as set forth in claim 1, wherein the conductive wire is inserted into the through hole from a guide hole, the guide hole being communicated with the through hole; and wherein a diameter of the guide hole for guiding the conductive wire is expanded toward the outside.

3. The motor as set forth in claim 1, wherein the positioning member has a guiding face; and wherein a width of an insertion space of the conductive wire which is defined by the guiding face and the inner face of the through hole is substantially the same as that of the conductive wire.

4. The motor as set forth in claim 1, wherein a groove for holding the conductive wire is provided on the inner face of the through hole; and wherein the groove is extended along an extending direction of the through hole.

5. The motor as set forth in claim 1, wherein the conductive elastic member has a forward end portion which extends in a direction diagonally to an extending direction of the through hole; and wherein the conductive elastic member urges the conductive wire in a direction perpendicular to an extending direction of the forward end portion.

6. The motor as set forth in claim 5, wherein the forward end portion of the conductive elastic member has a sliding end which slides on the conductive wire;

wherein the sliding end allows a sliding movement of the conductive wire in an insertion direction of the conductive wire; and wherein the sliding end restricts a sliding movement of the conductive wire in a drawing direction of the conductive wire.

7. The motor as set forth in claim 1, wherein said positioning member includes a pair of guiding and positioning members that are separated from each other by a distance that is substantially identical with a diameter of the conductive wire; and wherein guide faces for guiding the conductive wire are formed by opposed faces of the pair of guiding and positioning members.

8. The motor as set forth in claim 1, wherein the conductive elastic member is generally L shaped.

9. The motor as set forth in claim 1, wherein the conductive elastic member contacts the conductive wire at only a single location.

* * * * *